Figure 1:
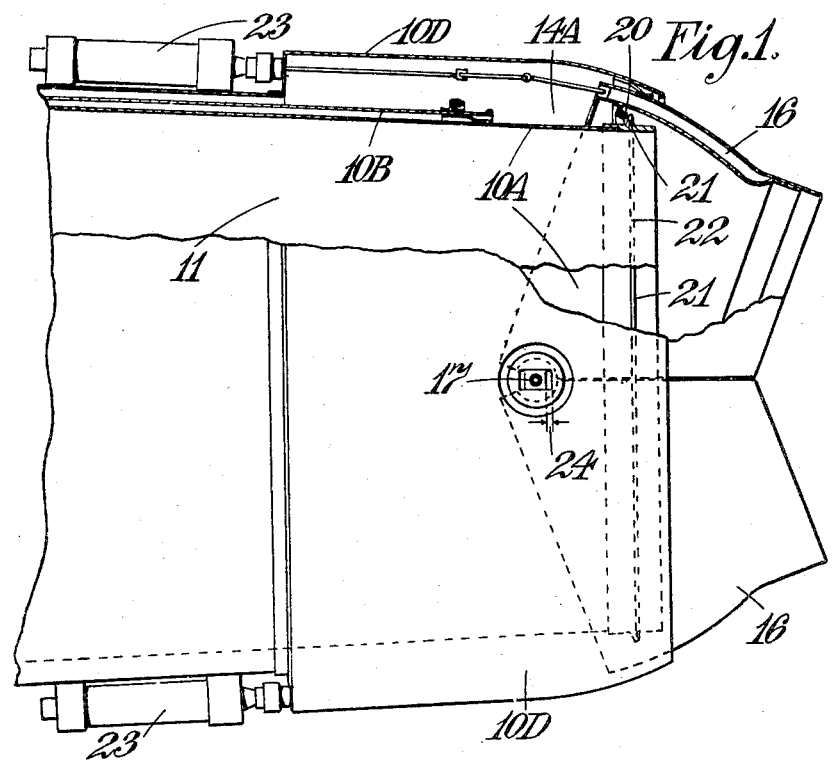

July 1, 1958  C. A. ELLIOTT  2,840,985
JET PIPE WITH PIVOTED OUTLET-AREA-VARYING NOZZLE ELEMENTS
Filed March 27, 1953  3 Sheets-Sheet 1

INVENTOR
C. A. ELLIOTT
BY Wilkinson & Mawhinney
ATTYS.

2,840,985

JET PIPE WITH PIVOTED OUTLET-AREA-VARYING NOZZLE ELEMENTS

Cyril Albert Elliott, Littleover, England, assignor to Rolls-Royce Limited, Derby, England, a British company Application March 27, 1953, Serial No. 344,978

Claims priority, application Great Britain April 10, 1952

9 Claims. (Cl. 60—35.6)

This invention relates to jet nozzles for jet propulsion units such for example as are used on aircraft and is more particularly concerned with jet nozzles of the type (hereinafter referred to as the type described) comprising nozzle segments pivoted for adjustment with respect to the exit end of a jet pipe for varying the effective discharge nozzle area.

In jet nozzles of the type described it is the practice to provide a gas sealing means for preventing leakage of gas between the extremity of the jet pipe and the internal surfaces of the nozzle segments, and in one known construction the gas sealing means have comprised sealing elements which come into abutment when the nozzle segments are adjusted to define the minimum effective nozzle area. It has been found that differential expansion of the parts of the assembly may render the gas sealing means ineffective and thus may give rise to leakage past the gas sealing means and it is the primary object of the present invention to avoid this difficulty.

According to the present invention a jet nozzle of the type described and comprising pivot bearing means supporting a nozzle segment for pivotal movement relative to the jet pipe and gas sealing means including a sealing element carried by the jet pipe and a co-operating sealing element carried by a nozzle segment, which sealing elements come into abutment when the nozzle segment is moved into a position reducing the effective area of the jet nozzle, is characterised in that the pivot bearing means is free for movement relative to the jet pipe in a direction substantially parallel to the axis of the jet pipe. In some constructions of jet nozzle, say where the pivot bearing means are supported in structure externally of the jet pipe, relative thermal expansion of the jet nozzle parts tends to cause separation of the gas sealing surfaces, and adoption of the invention enables the gas seal to be maintained by displacement of the pivot bearing means relative to the external structure.

The pivot bearing means may for instance include a squared part which is received in and bears on edges of an aperture which edges are parallel to the jet pipe axis thereby to have sliding freedom parallel to the jet pipe axis, or the pivot bearing means may be mounted in the structure at the ends of radius arms which on pivoting move the pivot bearing means substantially parallel to the jet pipe axis.

It is preferably arranged that gas loads imposed upon the nozzle segment are effective to cause said movement of the pivot bearing means to maintain such abutment; alternatively or in addition resilient means may be provided to load the pivot bearing means to maintain the sealing elements in abutment when the nozzle segment is extended.

The invention may be applied in nozzle arrangements such as described in British Patent No. 640,428 in which the nozzle segments are formed internally with passages through which a cooling air flow is induced and in which the jet pipe has a double skin, the pivot bearing means being carried by the outer skin which is relatively cool as compared with the inner skin.

Figure 2:
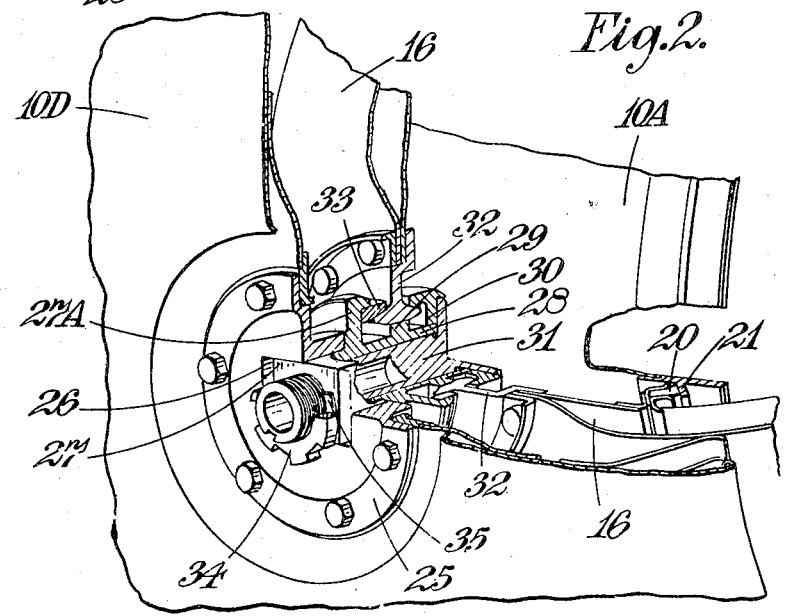
Figure 3:
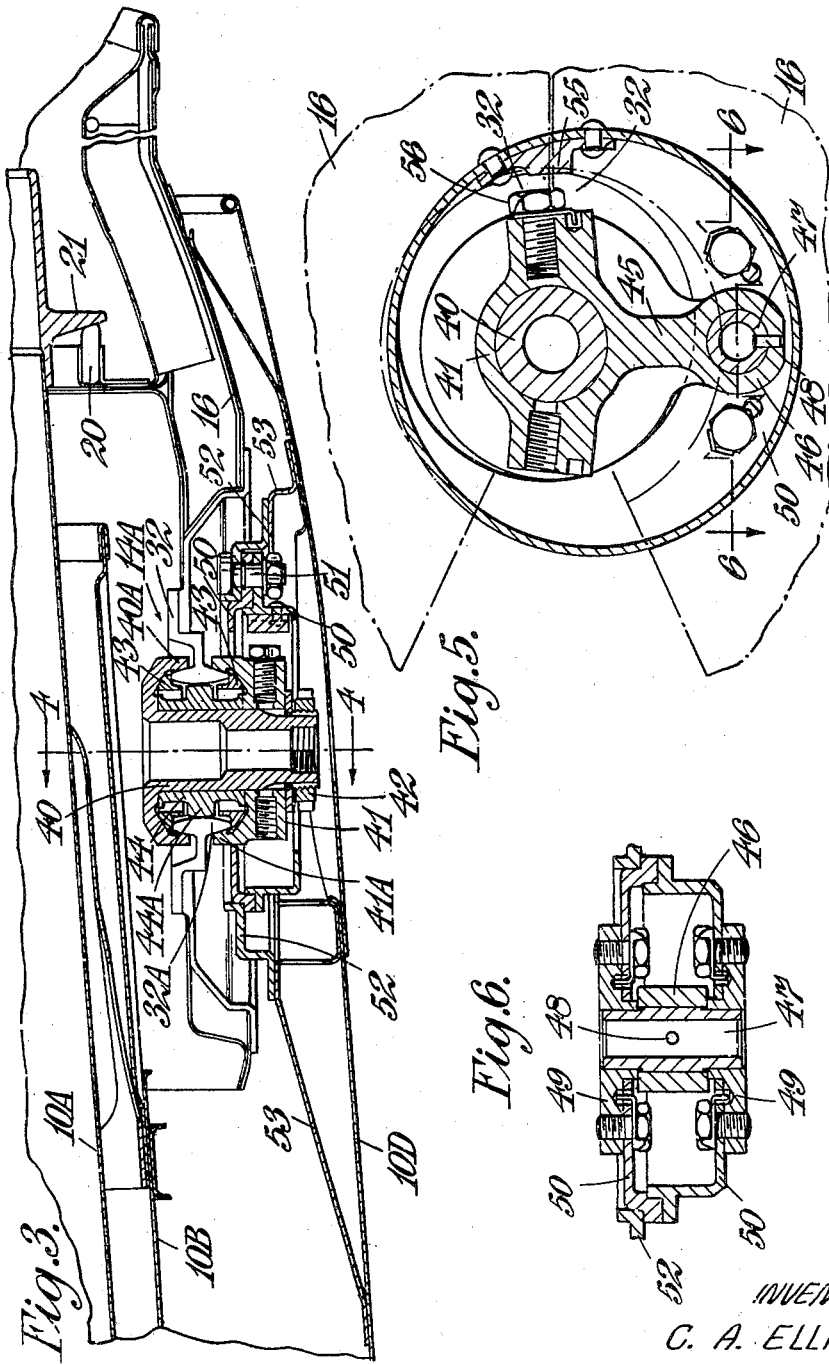
Figure 4:
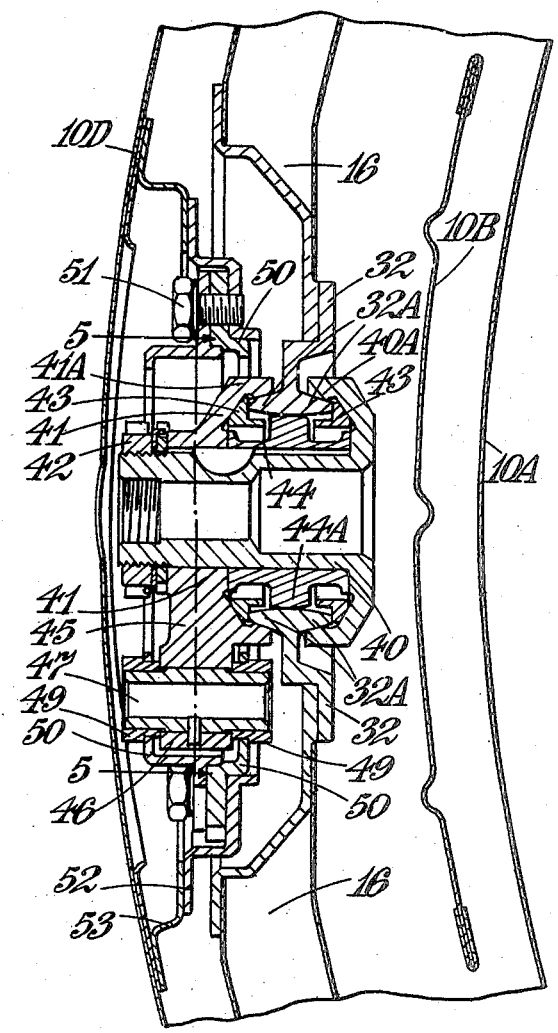

Two embodiments of the invention applied in such a jet nozzle arrangement will now be described with reference to the accompanying diagrammatic drawings, in which Figure 1 shows schematically the jet nozzle arrangement, Figure 2 illustrates in greater detail an embodiment permitting sliding movement of the pivot bearing means, Figure 3 illustrates in axial section an embodiment permitting pivotal movement of the segment bearing means, Figure 4 is a section on the line 4—4 of Figure 3, Figure 5 is a section on the line 5—5 of Figure 4, and Figure 6 is a section on the line 6—6 of Figure 5.

Referring to Figure 1, the nozzle arrangement illustrated is suitable to form the outlet of a jet-pipe of an aircraft jet propulsion engine in which fuel is burnt in the jet pipe to augment the propulsive thrust of the jet. The jet pipe comprises a sheet metal inner skin 10A forming the boundary of an exhaust passage 11 of a sheet metal outer skin 10B enclosing and spaced away from the inner skin 10A to insulate the latter from the aircraft structure (not shown). The orifice area of the nozzle is adjusted by providing movable nozzle segments 16 pivotally mounted on a cylindrical portion 10D of the jet pipe outer skin 10B so as to be capable of being retracted into and extended from the space 14A between the cylindrical portion 10D and the inner jet pipe skin 10A.

In this construction a pair of nozzle segments 16 are provided, each being formed substantially as half-zones of a sphere in accordance with British Patent No. 598,183, and each being formed for purposes described in British Patent No. 640,428 as hollow sheet metal structures. The nozzle segments are pivoted about a common axis on pivot bearing means generally indicated at 17 in Figure 1 and described in greater detail below.

The present invention is primarily concerned with maintaining an effective gas seal between gas sealing parts which come into abutment when the nozzle segments 16 are extended in the position shown in Figure 1.

The gas sealing parts comprise a substantially semi-circular seal element 20 on each segment 16 and a co-operating circular sealing flange 21 secured on the nozzle end of the inner skin 10A of the jet-pipe.

If the axis of the pivot bearing means 17 is fixed in the axial sense relative to the outer skin 10B and the parts 20, 21 are arranged in the extended position to abut along the dotted line 22 when the jet pipe is cold, then since in operation of the jet pipe the inner skin 10A is at a higher temperature than the outer skin 10B, the sealing flange 21 tends to move away from the sealing element 20. Since, moreover, the retraction and extension of the nozzle segments is effected by means of fluid-operated jacks 23 which have a degree of excess travel, it is possible for the segments, when the bearing means 17 are fixed, to pivot to follow up the axial expansion of the inner skin 10A until the parts 20 and 21 again abut, but in this case the sealing parts 20, 21 will be in contact only at points mid-way between the pivot bearing means 17 and thus there will be a gap between the sealing parts 20 and 21 which is a maximum adjacent the pivot bearing means 17 and decreases gradually to a zero where the parts 20 and 21 inter-abut.

The present invention provides an arrangement whereby the pivot bearing means 17 are movable axially of the jet pipe so that full circumferential contact of the surfaces 20 and 21 can be maintained despite differential expansion between the inner skin 10A and the outer skin 10B of the jet pipe.

The extent of axial movement of the bearing means 17 in the construction of Figures 1 and 2 is indicated at 24, and the nozzle segments are supported on the jet pipe so that with the nozzle segments extended, the gas loads acting on the nozzle segments 16 cause any axial movement of the pivot bearing means 17 necessary to accommodate differential expansion between the inner and outer skins 10A, 10B, of the jet pipe and to maintain the sealing parts 20, 21 in contact.

Referring now to Figure 2, the inner jet pipe skin 10A is shown as having its nozzle afforded by an end ring having the sealing flange 21 extending outwardly therefrom. The cylindrical extension 10D of the outer jet pipe skin supports diametrically opposite socket fittings of which one is shown at 25. The fitting 25 is formed with a rectangular aperture 26 which receives a square-sectioned portion of a trunnion piece 27 which has a less axial extent than the aperture 26 so that the trunnion piece 27 is free for movement in the rectangular aperture 26 axially of the jet pipe. The trunnion piece 27 is formed with a circular flange 27A and a cylindrical extension 28 formed with a circumferential, radially extending land 29, and a loose ring 30 is arranged to be clamped on the cylindrical extension 28 by a bolt element 31 which extends through the trunnion piece 27.

The nozzle segments 16 are each provided with a part-annular bearing member 32. The part-annular members 32 bear at their inner radius on the circumferential land 29 and have oppositely extending axial flanges to engage with a flange on the ring 30 and with a loose ring 33 which is positioned by an axial part of the flange 27A. The bolt 31 hold these parts in engagement. The bolt 31 is held by means of a nut 34 and lock washer 35.

The above arrangement of bearing support enables the nozzle segments 16 to rotate about the axis of the bolt 31, and also enables the trunnion piece 27, containing said axis, to move axially in the rectangular aperture 26.

The sealing parts 20 carried by the nozzle segments 16 include each a strip of deformable heat-resisting material.

It will be appreciated that in this construction relative expansion between the inner jet pipe skin 10A and the outer skin portion 10D is accommodated by sliding movement of trunnion piece 27 to maintain surfaces 20 and 21 in gas sealing contact.

Instead of making the pivoted support means for the nozzle segments 16 axially slidable as shown in Figures 1 and 2, the pivotal support means may be carried at the ends of radius members which members are pivoted so that their ends are capable of a substantial displacement axially of the jet pipe.

One such arrangement is illustrated in Figures 3 to 6 in which the parts 10A, 10B are again the inner and outer jet pipe skins, the part 10D is again an annular wall portion encircling the end of the jet pipe skin 10A to form a housing space into which the nozzle segments 16 can be retracted when it is desired to increase the effective area of the jet nozzle.

The trunnion arrangement for carrying the nozzle segments is similar to that of the first construction, and comprises a part-annular member 32 on each segment 16 adjacent each trunnion there being a pair of trunnions one on each side of the jet pipe. Each member 32 has at its inner radius a pair of oppositely-directed part-annular axially extending flanges 32A. One flange 32A of each of the adjacent members 32 bears by its outer surface which is conical, on the inner surface of an axially-directed circumferential flange 40A extending through the trunnion of a bolt member 40 extending through the trunnion. The other flange 32A bears by its outer surface which is conical, on the inner surface of an axially-directed annular flange 41A formed on a member 41 through which the trunnion is supported in the structure 10D. The flanges 32A, 40A and 41A are held in position axially of the trunnion by a nut 42 on the end of the bolt 40 and by a pair of end bearing rings 43 which are received within the flange 40A and the flange 41A respectively. The flanges 32A are held radially against the flanges 40A, 41A by a circumferential land 44A on a cylindrical member 44 which also serves to determine the spacing of the head of the bolt 40 and the member 41.

Each of the trunnion arrangements is mounted in the fixed structure of the jet nozzle arrangement in the following way. The member 41 of the trunnion arrangement is formed with a radius arm 45 which projects radially of the trunnion axis and terminates at its end in a hollow boss 46 receiving a pivot pin 47 which is locked to the boss by a pin 48. The ends of the pivot pin 47 project beyond the boss 46 and engage in bearing members 49 in the form of lugged bushes bolted to sole plates 50. The sole plates 50 are in turn secured by studs and bolts 51 to a ring 52 welded to a patch 53 which in turn is welded to the inner wall of the structure 10D. The sole plates 50, the ring 52 and patch 53 have central apertures to accommodate the trunnion, and one of the sole plates 50 carries an abutment 55 to co-operate with a stud 56 threaded into the member 41 to limit the pivoting of the member 41 (and thus the whole trunnion) about the axis of the pivot 47.

The pivot 47 is disposed with its axis at right angles to the axis of the jet pipe 10A and parallel to the trunnion axis and offset (as viewed axially of the jet pipe) from the trunnion axis so that when the member 41 rocks about the pivot pin 47 the trunnion moves as a whole substantially axially of the jet pipe. Thus the relative expansion between the jet pipe 10A and the structure 10D which tends to cause separation of the seal elements 20, 21, is accommodated. The gas loads on the nozzle segments 16 tend to move them to maintain the engagement of the sealing elements 21.

I claim:

1. A jet nozzle comprising a jet pipe having inner and outer skins, the inner skin defining a channel for the flow of hot jet gases and the outer skin being spaced away from the inner skin to be cooler than the inner skin, said jet pipe having an outlet therefrom, a nozzle segment, pivot bearing means supporting said nozzle segment for pivotal movement relative to the outlet of the jet pipe to vary the effective outlet area thereof, said nozzle segment when in position to reduce the jet pipe outlet area intercepting a portion of the hot jet gas and thereby transmitting an axial thrust to the pivot bearing means, peripherally-extending gas sealing means including a first sealing element carried externally by said inner skin and a co-operating sealing element carried by the nozzle segment, and support means carried by said outer skin and carrying said pivot bearing means with freedom of the latter for movement relative to the outer skin in a direction substantially parallel to the axis of the jet pipe, whereby differential axial expansion of the inner and outer skins is compensated by substantially axial movement of the pivot bearing means relative to the outer skin to ensure abutment of the sealing elements with one another around their peripheries.

2. A jet nozzle as claimed in claim 1, wherein said support means is provided with slide surfaces extending substantially parallel to the axis of the jet pipe, and said pivot bearing means comprises co-operating surfaces slidingly engaging with said surfaces of the support means whereby said pivot bearing means is guided for sliding movement in said support structure in a direction substantially parallel to the jet pipe axis.

3. A jet nozzle as claimed in claim 1, wherein said pivot bearing means includes a pivot receiving member having a squared portion, and the support means comprises a part having an aperture therein whereof the edges are substantially parallel to the jet pipe axis, said squared portion of the pivot receiving member being engaged in the aperture with its surfaces in sliding contact with said edges to guide said pivot member to slide in a direction substantially parallel to the axis of the jet pipe.

4. A jet nozzle comprising a jet pipe having an outlet therefrom, a nozzle segment, pivot bearing means adapted to support said nozzle segment for pivotal movement relative to the outlet of the jet pipe to vary the effective outlet area, gas sealing means including a first sealing element carried by the jet pipe and a co-operating sealing element carried by the nozzle segment and adapted to come into abutment with the first sealing element when the nozzle segment is moved into a position reducing the effective area of the jet nozzle, and support means adapted to support said pivot bearing means to swing as a whole about a swinging axis which is parallel to the pivotal axis of the pivot bearing means and is offset from the pivotal axis by a distance at right angles to the jet pipe such that the pivot bearing means are capable of a substantial displacement axially of the jet pipe.

5. A jet nozzle as claimed in claim 4, wherein the support means includes an arm having the pivotal bearing means mounted thereon at one end thereof and projecting therefrom radially of the pivotal axis of the pivot bearing means, and a pivot pin engaged in said arm at its other end and connecting said arm to swing about said offset swinging axis.

6. A variable-area jet nozzle for controlling the discharge of a hot jet gas from a jet pipe, comprising a plurality of nozzle segments, peripherally-extending sealing means including a sealing element carried by each of said nozzle segments and a co-operating sealing element carried by the donwstream end of said jet pipe, pivotal mounting means for said nozzle segments, said nozzle segments when in position to reduce the jet pipe outlet area intercepting a portion of the hot jet gas and thereby transmitting an axial thrust to the pivotal mounting means, supporting structure for said nozzle segments spaced away from the downstream end of the jet pipe to be cooler than said jet pipe, and means to support said pivotal mounting means in said supporting structure with freedom to move substantially axially of said jet pipe without interfering with the pivotal movement of the nozzle segments on said pivotal mounting means, thereby to compensate for differential axial expansion of said supporting structure and said jet pipe and to ensure abutment of the sealing elements with one another around their peripheries.

7. A variable-area jet nozzle arrangement as claimed in claim 6, wherein said means to support said pivotal mounting means in said supporting structure comprises means defining an aperture in said supporting structure having edges substantially parallel to the jet pipe axis, and a member slidably mounted in said aperture and having a surface to co-operate with each edge of the aperture, said pivotal mounting means being mounted on said member.

8. A jet nozzle as claimed in claim 6 comprising resilient means acting to load the pivot bearing means in a sense to maintain abutment of said sealing elements.

9. A variable-area jet nozzle for a jet pipe, comprising a plurality of nozzle segments, peripherally-extending sealing means including a sealing element carried by one of said nozzle segments and a co-operating sealing element carried by the downstream end of said jet pipe, pivotal mounting means for said nozzle segments, supporting structure for said nozzle segments spaced away from the downstream end of the jet pipe to be cooler than said jet pipe, and means to support said pivotal mounting means in said supporting structure with freedom to move substantially axially of said jet pipe comprising a link swingably mounted in said support structure, said pivotal mounting means being carried in a part of said link remote from its swinging axis, thereby to compensate for differential axial expansion of said supporting structure and said jet pipe and to ensure abutment of the sealing elements with one another around their peripheries.

References Cited in the file of this patent

UNITED STATES PATENTS

| | | |
|---|---|---|
| 209,475 | Harris | Oct. 29, 1878 |
| 801,521 | Haas | Oct. 10, 1905 |
| 1,947,335 | De Mattia | Feb. 13, 1934 |
| 2,603,060 | Brown | July 15, 1952 |
| 2,635,419 | Ambrose et al. | Apr. 21, 1953 |
| 2,639,578 | Pouchot | May 26, 1953 |
| 2,722,801 | Lombard | Nov. 8, 1955 |

FOREIGN PATENTS

| | | |
|---|---|---|
| 145,821 | Australia | Mar. 20, 1952 |